Aug. 13, 1940.                D. H. STEWART                2,211,355
                            PHOTOGRAPHIC SHUTTERS
                            Filed April 16, 1938
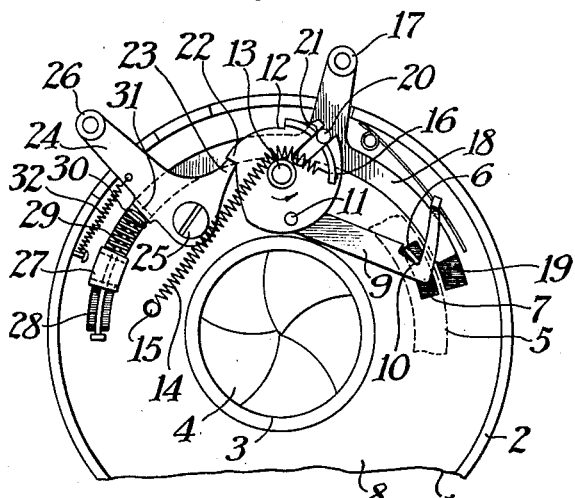
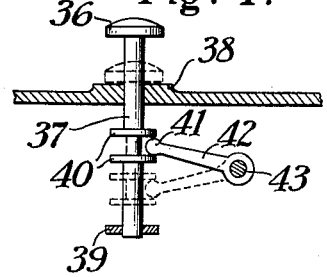
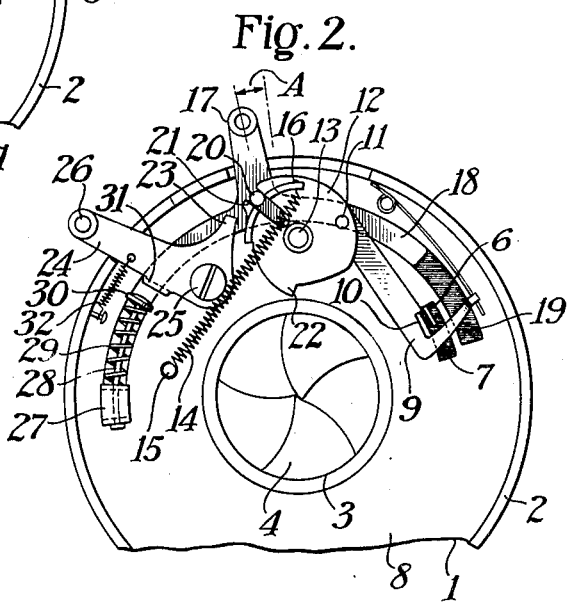
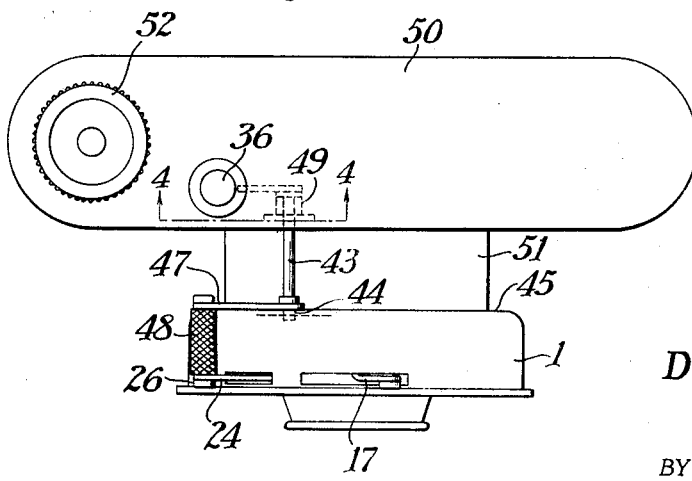
Donald H. Stewart
INVENTOR
BY Newton M. Perrins
   George A. Gillett, Jr.
ATTORNEYS Patented Aug. 13, 1940

2,211,355

UNITED STATES PATENT OFFICE 2,211,355

PHOTOGRAPHIC SHUTTER

Donald H. Stewart, Rochester, N. Y., assignor to Eastman Kodak Company, Rochester, N. Y., a corporation of New Jersey Application April 16, 1938, Serial No. 202,493

8 Claims. (Cl. 95—63)

This invention relates to photographic shutters of the type in which a spring must be manually set before an exposure can be made.

One object of my invention is to provide a shutter of the class described in which the shutter trigger is normally inoperative but can be moved to an operative position when the shutter is in condition for exposure. Another object of my invention is to provide a shutter in which movement of the shutter setting lever also tensions the shutter trigger. Another object of my invention is to provide a spring situated between the shutter setting lever and the trigger in such a manner that when the shutter setting lever is moved to a set position, the spring contacts with the trigger and, being under tension, not only serves to hold the trigger in an operative position, but likewise assists the master member in starting a movement in a direction to operate the shutter leaves. Still another object of my invention is to provide a trigger which is normally held in an inoperative position of rest and to provide spring means for holding it in this position, the spring means being overcome by a second spring means between the setting lever and trigger actuated only after the setting lever has been moved a predetermined distance. Still another object of my invention is to provide a simple connection for shutters extending between the shutter and the camera body, so that there may be a shutter release on the camera body cooperating with the trigger on the shutter, and other objects will appear from the following specification, the novel features being particularly pointed out in the claims at the end thereof.

In certain types of cameras incorporating a shutter release in the camera body, it is frequently desirable to operate the shutter trigger from the camera body and to make a simple and suitable connection between the camera body and shutter for operating the trigger. In order to indicate to an operator that the shutter has not been set, I have provided a trigger structure in which the trigger is normally held in its inoperative or lowermost position, so that the shutter release on the camera body will also remain in a depressed position until the shutter is set, at which time the shutter release will be raised from the camera body into an operative position.

In such cameras it is also possible to incorporate connections between the shutter body release and a film winding mechanism so that connections between the operating levers on a shutter and the camera body are desirable. I have provided a simple form of release which can readily be applied to shutters and which has the advantage of including only a shaft which may pass through a bearing in the camera body and which may, therefore, readily be constructed so as to form a light-tight connection.

Coming now to the drawing, wherein like reference characters denote like parts throughout:

Fig. 1 is a plan view of the essential parts of a shutter constructed in accordance with and embodying a preferred form of my invention, the parts being shown in position for exposure and the shutter cover being removed.

Fig. 2 is a view similar to Fig. 1, but with the parts in an inoperative position.

Fig. 3 is a top plan view of my preferred form of shutter mounted on a simple type of camera, and Fig. 4 is a section on line 4—4 of Fig. 3.

As indicated in Fig. 1, the shutter may comprise a casing 1 having an upstanding flange 2 and a central opening 3 through which light rays pass in making an exposure. The shutter leaves 4 may be of a known type which may be moved back and forth to open and close the aperture 3 by means of a blade ring 5 including an upstanding lug 6 projecting through the slot 7 in the shutter plate 8.

As thus far described, the mechanism is of a known type.

The lug 6 may be oscillated by means of a latch 9 having a hook 10 for engaging the lug 6 and being pivotally attached at 11 to the master member 12, which is, in turn, pivoted at 13 to the shutter plate 8. The master member is normally turned in a counter-clockwise direction by means of the spring 14 anchored at 15 to the shutter plate 8 and at 16 to the master member. In order to tension the master member and to turn it from its inoperative position, as shown in Fig. 2, to its operative position, shown in Fig. 1, there is a setting lever 17 carried by an arcuate plate 18 mounted to slide in the slot 19.

The lever 17 carries a pin 20 slidably mounted in the groove 21 of the master member so that when the lever 17 is moved from the position shown in Fig. 2 to that shown in Fig. 1, a latch element 22 on the master member is engaged by a latch element 23 of a trigger member 24 pivoted at 25 to the shutter plate 8 and having an operating handle 26. Thus, when the parts are in the position shown in Fig. 1, the latch elements 22 and 23 are engaged because one end 27 of the arcuate member 18 is provided with a pair of spaced bearings through which a curved pin 28 passes, this curved pin supporting a spring 29 which may be placed under tension as soon as the head 30 engages the downwardly extending lug 31 of the trigger, this being caused by moving the handle 17 of the setting lever in a clockwise direction. As soon as the spring 29 reaches sufficient tension to overcome the spring 32, the trigger is moved from its inoperative position in Fig. 2 to a position in which the latch element 23 will be adapted to catch the latch element 22 when the master member has been fully tensioned. It requires only a small portion of the normal movement of lever 17 to place the spring 29 under tension. As this spring is much heavier than spring 32, it immediately overcomes the tension of this light spring and moves the trigger 26 to its operative position.

There are a number of advantages in having this construction: Should the operator attempt to make an exposure, by pressing down the trigger 26 or by pressing down the camera body release 36 which will be hereinafter more fully described, he will immediately find that the trigger cannot be depressed, if the shutter is not in condition for exposure. In other words, since the trigger is at its limit of downward movement when the setting lever is in the position shown in Fig. 2, it cannot be further moved. This will, therefore, call to the attention of the operator the necessity of conditioning the shutter for exposure by moving the setting lever 17 in a clockwise direction until the master member has been set and the trigger has been operatively positioned.

The body release 36 may consist, as indicated in Figs. 3 and 4, of a push-button carried by a plunger 37 mounted in bearings 38 and 39 carried by the camera body. A pair of disk-like members 40 engage both sides of the end 41 of a lever 42 attached to a rotatable shaft 43 which connects the camera body and the shutter 1. This shaft is likewise carried by a bearing member 44 on the back wall 45 of the shutter, this bearing being preferably arranged coaxially with respect to the pivot 25 of the trigger 26. A lever 47 of the same length as the trigger 26 is provided, and a suitable connecting member 46 is arranged between the lever 47 and the trigger 26. Thus, this member forms a connecting member and may likewise be used as a convenient grip, if the shutter trigger is to be operated from the shutter itself. However, if it is desirable to actuate the shutter from the body release member 36, the shaft 43 transmits motion to the shutter 26.

The particular connection described above is desirable because, since the shaft 43 passes through a bearing 49 in the camera body 50, it is a simple matter to make a light-tight connection and the shaft lying adjacent to the tubular shutter support 51 is not in position to be readily damaged in use.

The camera 50 may include the usual winding key 52 for moving film past the exposure aperture and the particular camera diagrammatically shown in Fig. 3 is preferably of the so-called miniature type utilizing 35 mm. perforated or unperforated film.

The operation of the shutter and camera above described is extremely simple. If an operator desires to take a picture, the setting lever 17 is first moved in a clockwise direction to tension the master member spring 14. When the lever has travelled a very short distance, as indicated by A in Fig. 2, the head 30 of the spring plunger has been brought into contact with the downwardly extending lug 31 of the trigger 26 and continued movement of the setting lever 17 immediately tensions the spring 29, this tension at once overcoming the resistance of the spring 32 and moving the trigger in a clockwise direction. The trigger will, therefore, be resiliently pressed against the periphery of the master member 12, and as soon as the master member reaches the position shown in Fig. 1, the latching arm 23 will snap behind the shoulder 22. This movement of the setting arm not only moves the trigger to its operative position of Fig. 1, but if the shutter is connected up with a shutter body release 36, as indicated in Fig. 3, it will move the release member 36 from the broken line positions in Fig. 4 to the full line positions.

An exposure may now be made by depressing either the body release 36 or the elongated trigger grip 48 of the shutter. When a fresh area of film has been wound by the winding key 52, if the operator should forget to set the shutter, he may again endeavor to depress either the body release 36 or the trigger grip 48. However, the parts will be in the position indicated in Fig. 2 and in broken lines in Fig. 4, in which position no depression of either of these members is possible. Consequently, the operator will immediately set the shutter by moving the setting lever 17 in a clockwise direction to set the master member and position the trigger for the second exposure.

What I claim is:

1. In a shutter for photographic cameras, the combination with a shutter casing, of mechanism mounted in the casing including a master member, a spring for moving the master member in one direction, a shutter trigger adapted to latch the master member in a position in which the spring is tensioned when moved through a path of movement, movable means for setting the master member and tensioning said spring, an arm carried by said means and adapted to cross the path of movement of the trigger for engaging and moving the shutter trigger into an operative latching position to hold the master member when set.

2. In a shutter for photographic cameras, the combination with a shutter casing, of mechanism mounted in the casing including a master member, a spring for moving the master member in one direction, a shutter trigger adapted to latch the master member in a position in which the spring is tensioned, a spring for normally holding the trigger in an inoperative position, in which it may not latch the master member, means for setting the master member and tensioning the first mentioned spring, an arm carried by said means for setting the master member positioned for engaging the trigger moving it against its spring into an operative master member latching position as said means is moved to set the master member, whereby subsequent operation of the trigger may release the master member to make an exposure.

3. In a shutter for photographic cameras, the combination with a shutter casing, of mechanism mounted in the casing including a master member, a spring for moving the master member in one direction, a shutter trigger adapted to latch the master member in a position in which the spring is tensioned, a spring for normally holding the trigger in an inoperative position in which it may not latch the master member, means for setting the master member and tensioning the first mentioned spring, said means also including a resilient member for engaging the trigger, moving it against its spring into an operative master member latching position, whereby subsequent operation of the trigger may release the master member to make an exposure.

4. In a shutter for cameras, the combination with a shutter casing, of mechanism mounted therein including a master member, a spring for moving the master member in one direction, a trigger, a second spring for normally holding the trigger in an inoperative position, a lever for setting the master member tensioning the first mentioned spring and means carried by the lever for engaging and moving the trigger from its inoperative to its operative position, in which said trigger may latch the tensioned master member.

5. In a shutter for cameras, the combination with a shutter casing, of mechanism mounted therein including a master member, a spring for moving the master member in one direction, a trigger, a second spring for normally holding the trigger in an inoperative position, a lever for setting the master member tensioning the first mentioned spring and a spring member carried by the lever for engaging the trigger as the master member is tensioned to move said trigger from its inoperative position to an operative position, in which said trigger may latch said master member in a tensioned position.

6. In a shutter for cameras, the combination with a shutter casing, of mechanism mounted therein including a master member, a spring for moving the master member in one direction, a trigger, a second spring for normally holding the trigger in an inoperative position, a lever for setting the master member tensioning the first mentioned spring and a spring plunger carried by the setting lever and positioned to engage and move the trigger toward an operative, master member latching position as the master member is moved.

7. In a shutter for cameras, the combination with a shutter casing, of mechanism therein including a master member including a latch element, a mount on which the master member may oscillate, a spring tending to turn the master member in one direction, a pivotally mounted trigger including a latch element, a spring tending to turn the trigger out of latching engagement with the latch element of the master member, a lever for tensioning the master member and a spring means carried by the lever for engaging and moving the trigger against its spring, movement of the lever being adapted to bring the latch elements of the master member and trigger into engagement when said lever is moved in a direction to set the shutter.

8. In a shutter for cameras, the combination with a shutter casing, of mechanism therein including a master member including a latch element, a mount on which the master member may oscillate, a spring tending to turn the master member in one direction, a pivotally mounted trigger including a latch element, a spring tending to turn the trigger out of latching engagement with the latch element of the master member, and a single movably mounted setting lever positioned to engage the master member and trigger and to simultaneously move both these members into position for their latch elements to engage against the torque of their respective springs.

DONALD H. STEWART.